United States Patent [19]
Haka

[11] Patent Number: 5,720,216
[45] Date of Patent: Feb. 24, 1998

[54] POWER TRANSMISSION WITH LUBRICATION FEED CIRCUIT

[75] Inventor: Raymond James Haka, Brighton, Mich.

[73] Assignee: General Motors Corporation, Detroit, Mich.

[21] Appl. No.: 741,861

[22] Filed: Oct. 31, 1996

[51] Int. Cl.⁶ .................................................. F01B 31/00
[52] U.S. Cl. ............................................. 92/106; 184/6.12
[58] Field of Search .......................... 92/106, 108, 110; 184/6.12

[56] References Cited

U.S. PATENT DOCUMENTS

| | | | |
|---|---|---|---|
| 2,765,061 | 10/1956 | Fawick | 92/106 |
| 2,868,341 | 1/1959 | Snoy | 92/106 |
| 3,064,780 | 11/1962 | Richards et al. | 92/106 |
| 3,079,896 | 3/1963 | Johnston | 92/106 |
| 4,999,002 | 3/1991 | Fink | 92/106 |

FOREIGN PATENT DOCUMENTS

| | | | |
|---|---|---|---|
| 889857 | 7/1953 | Germany | 92/106 |
| 531104 | 7/1955 | Italy | 92/106 |

*Primary Examiner*—Thomas E. Denion
*Attorney, Agent, or Firm*—Donald F. Scherer

[57] ABSTRACT

A power transmission has a high pressure fluid feed for supplying fluid pressure to the control chamber of a movable sheave. The high pressure fluid is supplied through a tube supported for relative rotation in a pair of spaced bushings. One bushing has radial passages for communicating the high pressure fluid from the tube to the chamber and axial passages on the outer periphery circumferentially spaced from the radial passages. The other bushing has uninterrupted inner and outer sealing surfaces. The space between the bushings receives leakage fluid escaping passed the outer surface of the tube and the inner surface of one bushing. This leakage fluid is redirected, at least partially, by the axial passages to a lubrication passage in the transmission.

1 Claim, 2 Drawing Sheets

5,720,216

POWER TRANSMISSION WITH LUBRICATION FEED CIRCUIT

TECHNICAL FIELD

This invention relates to fluid systems for power transmissions, and more particularly, to the fluid delivery through a lubricating circuit of the system.

BACKGROUND OF THE INVENTION

Power transmissions require hydraulic fluid to lubricate various components, such as bearings and gears, within the transmission. The lubrication fluid is taken from the system regulator valve for distribution through passages to the transmission components to be lubricated. The fluid leaking from the high pressure control passages is generally returned to the fluid reservoir without any specific direction to lubricating passages.

SUMMARY OF THE INVENTION

It is an object of the present invention to provide an improved bushing/seal joint in a transmission for directing leakage from a high pressure supply to a lubrication circuit.

In one aspect of the invention, a high pressure feed tube is supported for relative rotation in a pair of spaced bushings. Fluid leaking from the high pressure tube passed the tube/bushing seal surface of one bushing is collected in a chamber between the bushings for delivery through axial passages in one of the bushings to a lubrication circuit.

Continuously variable transmissions (CVT) of the belt type, require spaced pulleys or sheaves which have at least one movable half of each sheave. One of the sheaves is pressurized by high pressure fluid to enforce movement toward the other half of the sheave thereby forcing the belt radially outward to change the drive ratio between the pulleys. The pressure required to move the sheave and maintain the desired position is high pressure fluid which must be delivered from a source external to the assembly of the sheave itself.

In the present invention, the high pressure fluid is distributed to a central passage in a shaft on which the sheave is drivingly connected. The high pressure fluid in the tubing is directed radially outward through a plurality of passages for use in the control chamber of the sheave. Since the bushings within the shaft must have clearance of a slight mount to prevent binding between the tube and the bushings during rotation of the shaft, some fluid of the high pressure source will leak between the tube and bushing interface. This leakage is collected within a chamber between spaced bushings.

One of the bushings has a complete or uninterrupted inner and outer circumference, one of which seals on the shaft inner surface and the other of which seals on the tube outer surface. The other bushing includes radial passages through which the high pressure fluid flows from the tube to radial passages in the shaft. The tube is rotatably sealed within the inner surface of this bushing, such that some clearance is required and therefore leakage beyond this interface will occur. This second bushing has axially extending passages which direct the fluid collected in the space between the bushings through a lubricating system downstream of the tube and bushings.

The bushing utilized to dispense or direct the lubrication fluid has the inner diameter sealed by a sphere or ball member, such that the fluid in the tube is transferred to a control chamber for the sheave or leak pass the bushing tube interface for direction through the axial passages.

DESCRIPTION OF AN EXEMPLARY EMBODIMENT

Figure 1:
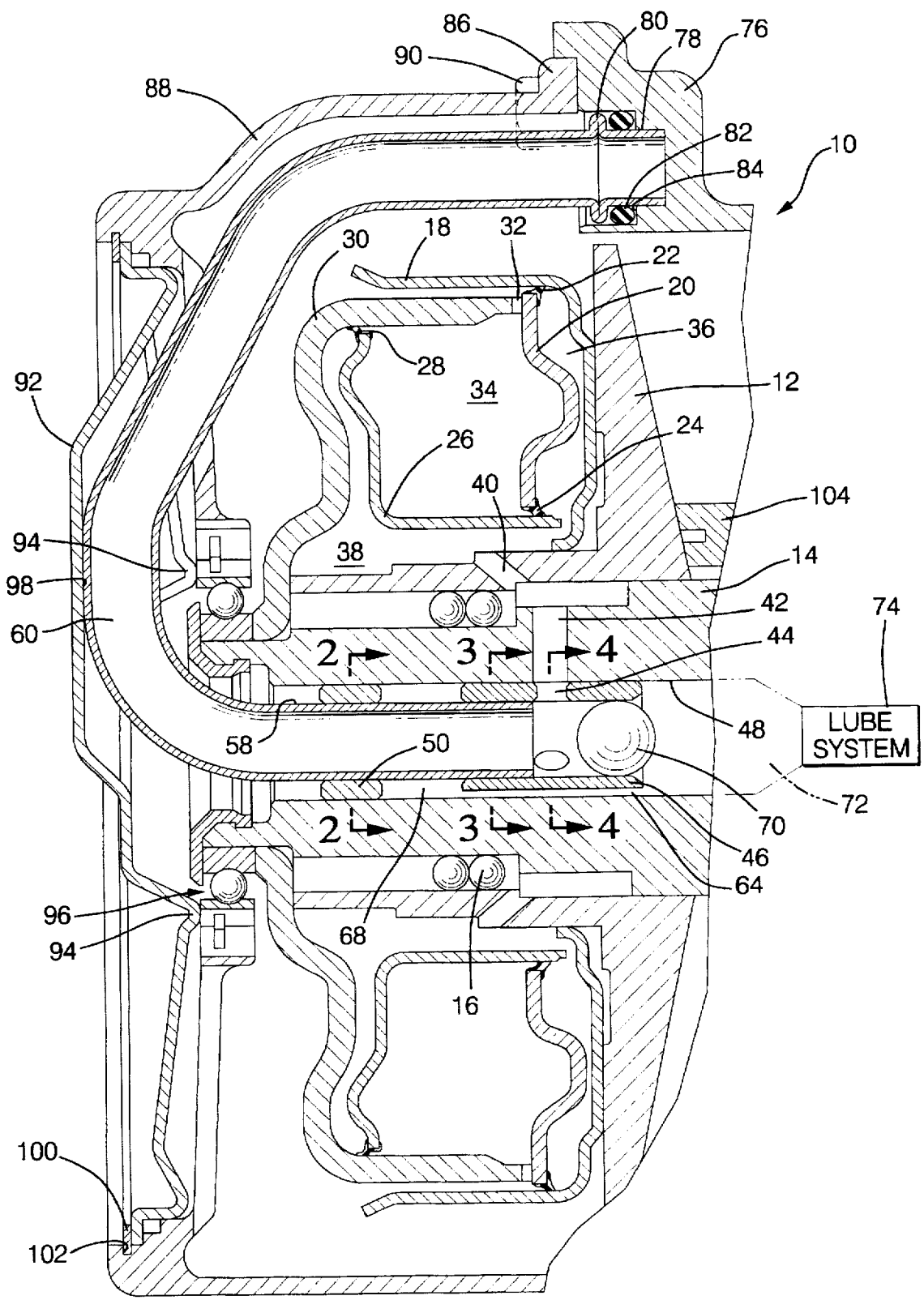
FIG. 1 is an elevational view partly in section of a portion of a continuously variable transmission system incorporating the present invention.

Referring to the drawings, and particularly FIG. 1, there is seen a portion 10 of a power transmission. The power transmission includes a variable pulley drive which is comprised of a pair of sheaves. One sheave has a pulley or sheave half 12 which is slidably disposed on a transmission shaft 14. The other sheave half (not shown) is fixed to the shaft 14.

The sheave half 12 and the shaft 14 are drivingly connected by a plurality of balls 16 which also cooperate to provide a sliding joint between the shaft 14 and the sheave half 12. The sheave half 12 has secured thereto a cup-shaped flange 18 in which is slidably disposed a seal member 20 having an outer annular lip seal 22 and an inner annular lip seal 24. The outer annular lip seal 22 cooperates with the flange 18 to provide a sealed interface and the inner annular lip seal 24 cooperates with a piston 26 to proved a sealed interface.

The piston 26 has an annular lip seal 28 which sealingly contacts a housing member 30. The spaced between the piston 26 and the seal member 20 has a plurality of vent passages 32 which permit any fluid connecting within a chamber 34 to exhaust thereby relieving any force which might otherwise occur due to the fluid being in the chamber 34.

The piston 26 and seal member 20 cooperate to form a pair of interconnected high pressure chambers 36 and 38. Both chambers 36 and 38 are annular in nature. The chambers receive pressurized fluid through a passage 40 which, in turn, is communicated with a plurality of radial passages 42 formed in the shaft 14. The radial passages 42 communicate with radial passages 44 which are formed in a bushing 46. The bushing 46 is press fit into a central passage 48 formed in the shaft 14 and a second bushing 50 is also press fit within the central passage 48.

Figure 2:
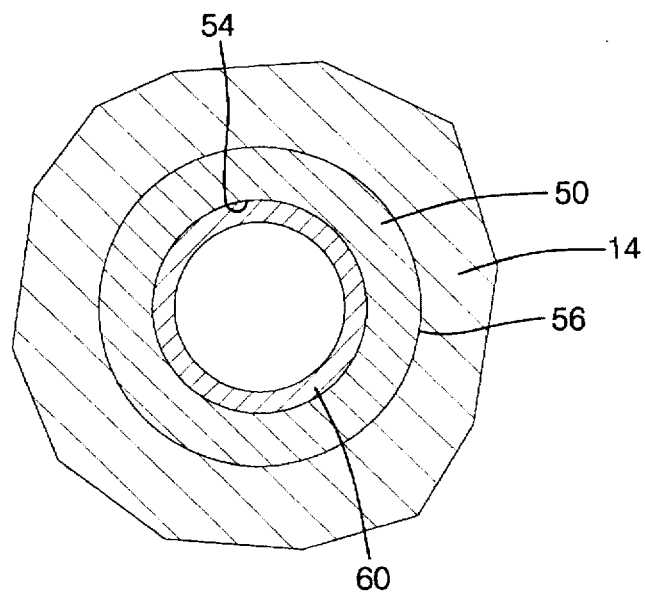
FIG. 2 is a sectional view taken along line 2—2 of FIG. 1.

As best seen in FIG. 2, the bushing 50 has an uninterrupted inner surface 54 and an uninterrupted outer surface 56. The outer surface 56 is preferably press fit in the passage 48 of the shaft 14 and the inner surface 54 is sized to have a sliding fit with an outer surface 58 of a tube member 60.

Figure 3:
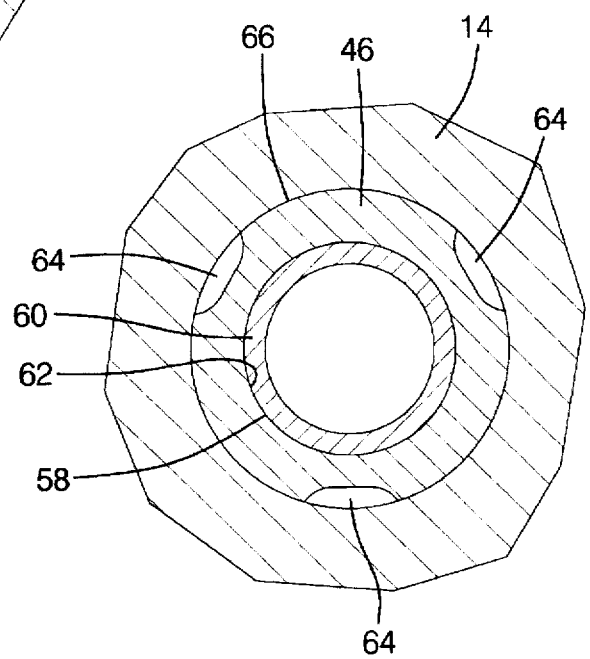
FIG. 3 is a view taken along line 3—3 of FIG. 1.
Figure 4:
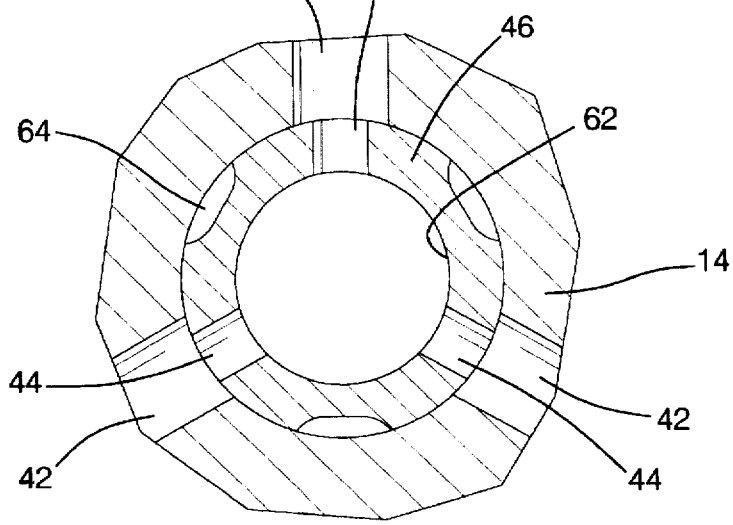
FIG. 4 is a view taken along line 4—4 of FIG. 1.

As best seen in FIGS. 3 and 4, the tube member 60 has a sealing fit at the outer surface 58 thereof with an inner surface 62 of the bushing 46. The outer surface of bushing 46 is press fit in the passage 48 of the shaft 14 but has formed thereon a plurality of axially extending passages 64 which interrupt an outer surface 66 of the bushing 46. The axially extending passage 64, as best seen in FIG. 4, are circumferentially spaced from the radial passages 44. Thus, there is no direct fluid connection between these passages 44 and 64.

A space or chamber 68 is formed between the bushings 46 and 50 and bounded on the inner and outer circumferences or peripheries thereof by the shaft 14 and the tube 60, respectively. The bushing 46 has a sphere or ball member 70 press fit to one end thereof. The ball 70 may be press fit through both the bushing 50 and the bushing 46, if desired.

thereby providing a ball sizing operating which will ensure the inner diameter of the bushings 50 and 46 are of the proper size for sealing engagement with the tube 60 when relative rotation occurs between these elements.

The central passage 48 communicates through a passage 72 to a lubrication system 74. The lubrication system is then operable in a well known manner to distribute lubricating fluid to the various gears, clutches and bearings of the transmission which are not shown.

The transmission 10 includes a housing 76 in which the tube 60 is secured. The tube 60 has an end portion 78 with a flanged member 80 formed thereon. An O-ring or annular seal 82 is disposed between the flange 80 and a shoulder 84 formed within the housing 76. The tube 60 is secured within the housing 76 by a flanged portion 86 of a cover member 88. The cover member 88 is secured to the housing 76 by a plurality of threaded fasteners 90.

The cover member 88 has a diaphragm or cover portion 92 which is disposed within the cover 88 in a manner to provide positioning tabs 94 for a bearing assembly 96 and to provide an abutment or end surface locator 98 for the tube 60. The cover 92 is secured in place by an annular locking ring 100 which is secured in a groove 102 formed in the cover 88.

During operation of the transmission, the sheave 12 will be moved toward and away from its other sheave component (not shown) to provide an operating diameter for a belt member 104. As the sheave 12 is moved rightward, as viewed in FIG. 1, the belt 104 will move outward along the diameter of the sheave 12. This outward movement on the belt will force inward movement on the companion pulley thereby changing the drive ratio between the pulley members. The operation of such devices is well known.

The pulley or sheave 12 is controlled in its axial position by fluid pressure admitted through the tube 60 and the radial passages 42 and 44 to the chambers 36 and 38. Fluid pressure in these chambers react to force the sheave 12 rightward as pressure increases and permit the sheave to move leftward as pressure decreases. The leftward movement of the sheave 12 upon lessening of the pressure in the chambers 36 and 38 is generally the result of a spring loaded sheave in the companion pulley, not shown. These types of sheave controls are well known and have been utilized in a number of transmissions.

Since the tube 60 is secured in a stationary housing 76, relative rotation occurs between the bushings 46 and 50 and the tube 60. Since relative rotation must occur, a slight clearance is required between these components. The sealing effect between the tube 60 and the bushings 46 and 50 is occasioned by the length of contact or the length of engagement between these devices or components. Thus, the longer the tube 60 engages within the bushings 46 and 50, the less leakage will occur for a given radial clearance. However, the length of the seal contact or engagement is preferably kept at a minimum since any eccentricity of the shaft 14 relative to the tube 60 will cause wear on the respective bushings.

Therefore, during operation of the transmission, it is inevitable that some fluid will leak from the tube 60 passed the bushing/seal interface between the bushing 46 and the tube 60. This leakage will collect at least partially within the chamber 68. The fluid pressure within the chamber 68 will, of course, increase depending upon the amount of fluid that can flow out of the chamber relative to the in-coming fluid.

The lubrication system 74 presents a slight back pressure effect on the fluid leaking into the chamber 68 which will result in some of the fluid leaking beyond the bushing 50 toward the bearing assembly 96. However, the majority of the fluid passing into the chamber 68 will be transmitted through the axial passages 64 to the lubrication passage 72 and then on into the lubrication system 74. Thus, the fluid leaking from the high pressure system in the tube 60 is directed to provide lubrication for elements within the transmission.

I claim:

1. A rotating bushing/seal joint in a transmission comprising:

a rotatable shaft having first radial passage means disposed therein, and a central passage communicating with said first radial passage means;

a chamber disposed on an outer surface of said shaft.

* * * * *